(12) United States Patent
Wang et al.

(10) Patent No.: US 12,406,473 B2
(45) Date of Patent: Sep. 2, 2025

(54) METHOD AND SYSTEM FOR ENHANCING ONLINE REFLECTED LIGHT FERROGRAPH IMAGE

(71) Applicant: Xi'an Jiaotong University, Xi'an (CN)

(72) Inventors: Shuo Wang, Xi'an (CN); Jing Liu, Xi'an (CN); Tonghai Wu, Xi'an (CN); Miao Wan, Xi'an (CN); Yaguo Lei, Xi'an (CN); Junyi Cao, Xi'an (CN)

(73) Assignee: Xi'an Jiaotong University, xi'an (CN)

( * ) Notice: Subject to any disclaimer, the term of this patent is extended or adjusted under 35 U.S.C. 154(b) by 469 days.

(21) Appl. No.: 18/154,760

(22) Filed: Jan. 13, 2023

(65) Prior Publication Data

US 2023/0154158 A1    May 18, 2023

(30) Foreign Application Priority Data

May 20, 2022    (CN) .......................... 202210550282.7

(51) Int. Cl.
*G06V 10/77*    (2022.01)
*G06N 3/0455*    (2023.01)
(Continued)

(52) U.S. Cl.
CPC ....... *G06V 10/7715* (2022.01); *G06N 3/0455* (2023.01); *G06N 3/048* (2023.01);
(Continued)

(58) Field of Classification Search
CPC .......... G06V 10/7715; G06V 10/7796; G06V 10/82; G06T 7/74; G06T 5/70;
(Continued)

(56) References Cited

U.S. PATENT DOCUMENTS 6,303,030 B1 *   10/2001   Desjardins ......... G01N 35/0098
                                                       210/695
9,821,310 B2 *   11/2017   Guldiken ........... G01N 33/5005
(Continued)

FOREIGN PATENT DOCUMENTS

CN    103886579 B    2/2017
CN    111832608 A    10/2020
(Continued)

OTHER PUBLICATIONS

Hui Tao et al., "A Method of Wear State Analysis Based on Integration of On-line Ferrograph Image Feature Information", Journal of Harbin University of Science and Technology, Aug. 15, 2012, vol. 17, No. 4, pp. 46-51.

*Primary Examiner* — Gregory M Desire (57) ABSTRACT

A method and system of enhancing online reflected light ferrograph images. The method includes: based on contour markers of wear particles in the online reflected light ferrograph image, performing concatenate fusion on the SqueezeNet-Unet-based wear particle position prediction network and the ResNeXt-CycleGAN image transformation network to construct an online reflected light ferrograph image enhancement model; determining loss function of the position prediction network; combining SSIM and L1 losses to optimize cycle-consistency loss function of the ResNeXt-CycleGAN image transformation network; designing overall loss function of the ferrograph image enhancement model by weighted fusion; and optimizing the ferrograph image enhancement model with the overall loss function as optimization object successively using a training sample set consisting of an original online reflected light ferrograph image and a traditional algorithm-enhanced online reflected
(Continued)

light ferrograph image and a training sample set consisting of the original image and an offline reflected light ferrograph image.

6 Claims, 4 Drawing Sheets

(51) Int. Cl.

| | |
|---|---|
| *G06N 3/048* | (2023.01) |
| *G06T 5/00* | (2024.01) |
| *G06T 5/50* | (2006.01) |
| *G06T 5/70* | (2024.01) |
| *G06T 7/00* | (2017.01) |
| *G06T 7/73* | (2017.01) |
| *G06V 10/778* | (2022.01) |
| *G06V 10/82* | (2022.01) |

(52) U.S. Cl.
CPC ............... *G06T 5/50* (2013.01); *G06T 5/70* (2024.01); *G06T 7/001* (2013.01); *G06T 7/74* (2017.01); *G06V 10/7796* (2022.01); *G06V 10/82* (2022.01); *G06T 2207/20192* (2013.01); *G06T 2207/20221* (2013.01); *G06T 2207/30164* (2013.01)

(58) Field of Classification Search
CPC . G06T 5/50; G06T 7/001; G06T 2207/20192; G06T 2207/20221; G06T 2207/30164; G06N 3/0455; G06N 3/048
See application file for complete search history.

(56) References Cited

U.S. PATENT DOCUMENTS

| | | | |
|---|---|---|---|
| 11,972,543 B2 * | 4/2024 | Meng | ............... G06T 11/001 |
| 12,025,952 B2 * | 7/2024 | Moon | ............... G03H 1/0808 |
| 2019/0073029 A1 | 3/2019 | Filatov et al. | |
| 2020/0234414 A1 | 7/2020 | Zamir et al. | |
| 2020/0321188 A1 | 10/2020 | Hujsak et al. | |
| 2020/0387780 A1 * | 12/2020 | Dai | ............... G06N 3/08 |
| 2022/0044374 A1 | 2/2022 | Liu et al. | |

FOREIGN PATENT DOCUMENTS

| | | |
|---|---|---|
| CN | 111931805 A | 11/2020 |
| CN | 112364899 A | 2/2021 |
| CN | 112767361 A | 5/2021 |

* cited by examiner

METHOD AND SYSTEM FOR ENHANCING ONLINE REFLECTED LIGHT FERROGRAPH IMAGE

CROSS-REFERENCE TO RELATED APPLICATIONS

This application claims the benefit of priority from Chinese Patent Application No. 202210550282.7, filed on May 20, 2022. The content of the aforementioned application, including any intervening amendments thereto, is incorporated herein by reference.

TECHNICAL FIELD

The disclosure relates to machinery condition monitoring and fault diagnosis, in particular to a method and system for enhancing an online reflected light ferrograph image.

BACKGROUND

The wear caused by the relative motion of the friction pairs has been considered as a leading cause of failure during the operation of the mechanical equipment. As published, nearly 40% of gear failures and 50% of bearing failures are directly associated with the wear, and the wear becomes a main factor triggering the engine failure. Therefore, effectively monitoring the wear state of key frictional pairs can guide the maintenance of the mechanical equipment and facilitate improving the service performance of the mechanical equipment.

As a product directly from the wear of friction pairs, wear particles can reflect the wear condition of the equipment, and thus become an important research object for wear mechanism analysis and wear condition monitoring. Specifically, the wear condition of the equipment can be identified through the number and size distribution of the wear particles, and the color and morphology of the wear particles are conducive to the exploration of the wear mechanism of the friction pairs. Therefore, the wear particle analysis has been a powerful technique for wear monitoring of the mechanical equipment. Among the existing wear particle analysis methods, the online ferrography technique has attracted considerable attention due to the advantages of comprehensive characterization of wear particle characteristics and high analysis accuracy, in which transmitted and reflected light images of wear particle are collected as research objects to achieve the visualized analysis of the wear condition of the mechanical equipment. However, due to light scattering caused by impurities, low transmittance of contaminated oil, and uneven illumination, the online reflected light ferrograph image suffers from low contrast and color bias, which seriously affect the accuracy of the wear particle feature extraction. In this regard, extensive attempts have been made to improve the contrast, contour and color characteristics of the on-line reflected light ferrograph image. Gray-scale transformation (such as linear and logarithmic transformation), histogram equalization and histogram matching can enhance the image contrast but hardly relieve the color bias. Retinex, Auto White Balance (AWB) and Automatic Color Equalization (ACE) algorithms can improve the image color but cannot enhance the contrast and contour feature information. The existing color enhancement algorithms, which optimize the image contrast and color by analyzing the imaging process of an online reflected light ferrograph image and establishing a reflected light ferrograph image enhancement model, still fail to address the defect that the contours of wear particles are blurred. Besides, this method involves many parameters required to be adjusted, and has poor generalization capability. Sharpening techniques based on edge operators (such as Sobel, Canny and Prewitt) and high-frequency boost filtering techniques can enhance the image contour characteristics, but cannot improve the contrast and color characteristics.

As mentioned above, by means of the online reflected light ferrograph image, multiple features of the wear particle, such as color, texture and contour, can be extracted, which form the basis for the online ferrography technique to characterize the wear condition of mechanical equipment. Nevertheless, under the interference of oil contamination and uneven illumination, the online reflected light ferrograph image suffers from information degradation associated with the color and contour of the wear particle. Traditional image enhancement algorithms can merely enhance a single feature of the online reflected light ferrograph image, and cannot optimize the multiple image features, failing to realize the accurate feature extraction of the wear particle.

SUMMARY

An object of this disclosure is to provide a method and system for enhancing an online reflected light ferrograph image to overcome the defects in the prior art. In the method provided herein, SqueezeNet-Unet and ResNeXt-CycleGAN are fused to enable fast and accurate enhancement for multiple wear particle characteristics in an online reflected light ferrograph image, which is suitable for the enhancement of all online reflected light ferrograph images in the field of wear particle analysis.

The technical solutions of the disclosure are described below.

In a first aspect, this application provides a method for enhancing an online reflected light ferrograph image, comprising:

(S1) fusing a U-shaped encoder-decoder network (Unet) architecture and a SqueezeNet network, based on contour markers of wear particles in the online reflected light ferrograph image, to construct a SqueezeNet-Unet-based wear particle position prediction network;

(S2) constructing a ResNeXt-cycle-consistent generative adversarial network (CycleGAN) image transformation network based on a CycleGAN architecture; and subjecting the SqueezeNet-Unet-based wear particle position prediction network and the ResNeXt-CycleGAN image transformation network to concatenate fusion to construct an online reflected light ferrograph image enhancement model;

(S3) determining a loss function of the SqueezeNet-Unet-based wear particle position prediction network; optimizing a cycle-consistency loss function of the ResNeXt-CycleGAN image transformation network by combining structural similarity (SSIM) loss and L1 loss; and designing an overall loss function of the online reflected light ferrograph image enhancement model by weighted fusion; and (S4) with the overall loss function of the online reflected light ferrograph image enhancement model as an optimization object, successively adopting a training sample set consisting of an original online reflected light ferrograph image and a traditional algorithm-enhanced online reflected light ferrograph image, and a training sample set consisting of the original online reflected light ferrograph image and an offline reflected light ferrograph image to optimize the online reflected light ferrograph image enhancement model, so as to enhance features of the wear particles in the online reflected light ferrograph image.

In some embodiments, step (S1) comprises:
(S101) marking contours of the wear particles in the online reflected light ferrograph image to construct a wear particle position marking map;
(S102) constructing an encoder of the SqueezeNet-Unet-based wear particle position prediction network based on the Unet architecture by using the SqueezeNet network combined with short-cut;
(S103) performing up-sampling on a wear particle feature map by using bicubic interpolation to construct a decoder of the SqueezeNet-Unet-based wear particle position prediction network; and
(S104) taking a Sigmoid activation function as an output layer of the SqueezeNet-Unet-based wear particle position prediction network; and transforming an input image of the output layer into a wear particle pixel position probability map to achieve automatic localization of the wear particles in the online reflected light ferrograph image.

In some embodiments, in step (S2), a mode of the concatenate fusion is weighted fusion based on an output of the SqueezeNet-Unet-based wear particle position prediction network and the original online reflected light ferrograph image; and a fusion result is taken as an input of the ResNeXt-CycleGAN image transformation network;

an input layer of a generator of the ResNeXt-CycleGAN image transformation network is formed by one Conv-GN-ReLU block, and is configured to adjust the number of channels of an input image to the number of input channels of a feature extraction part; the encoder of the generator of the ResNeXt-CycleGAN image transformation network is constructed by using two Conv-GN-ReLU blocks; a feature transformation layer of the generator of the ResNeXt-CycleGAN image transformation network is constructed by using ResNeXt; a decoder of the generator of the ResNeXt-CycleGAN image transformation network is constructed by using two Deconv-GN-ReLU blocks; and an output layer of the generator of the ResNeXt-CycleGAN image transformation network is formed by one Conv-GN-Tan H block; and a PatchGAN structure of a Pix2pix network is used as a discriminator of the ResNeXt-CycleGAN image transformation network; a dropout layer is introduced, and fully connected (FC)-Sigmoid is used as an output layer of the discriminator to output an image pixel discrimination probability.

In some embodiments, an input image of the ResNeXt-CycleGAN image transformation network is expressed by:

$$\text{Input\_Image} = A * B = \begin{bmatrix} a_{11}b_{11} & \ldots & a_{1n}b_{1n} \\ \ldots & \ldots & \ldots \\ a_{m1}b_{m1} & \ldots & a_{nn}b_{nn} \end{bmatrix};$$

wherein A represents an original reflected light image; B represents a wear particle distribution probability map output by SqueezeNet-Unet; and m represents image length and n represents image width.

In some embodiments, a pixel output value of the output layer of the generator of the ResNeXt-CycleGAN image transformation network is 0-255.

In some embodiments, in step (S3), the overall loss function of the online reflected light ferrograph image enhancement model is designed through steps of:

taking a Focal loss as the loss function of the SqueezeNet-Unet-based wear particle position prediction network; and taking a cross-entropy loss as an adversarial loss function of the ResNeXt-CycleGAN image transformation network;

matching luminance and contrast information of a cycle-consistency reconstructed image of the ResNeXt-CycleGAN image transformation network and an input image of the ResNeXt-CycleGAN image transformation network by using the SSIM loss; and combining the SSIM loss $L_{SSIM}$ and the L1 loss $L_{L_1}$ as the cycle-consistency loss function of the ResNeXt-CycleGAN image transformation network; and obtaining the overall loss function of the online reflected light ferrograph image enhancement model by weighted sum based on the Focal loss $L_{Focal\_loss}$ of the SqueezeNet-Unet-based wear particle position prediction network and an adversarial loss $L_{GAN}$ and the cycle-consistency loss function of the ResNeXt-CycleGAN image transformation network.

In some embodiments, the overall loss function $L_{Model\_Loss}$ of the online reflected light ferrograph image enhancement model is expressed as:

$$L_{Model\_Loss} = \lambda_{Focal\_loss} L_{Focal\_loss} + \lambda_{GAN} L_{GAN} + \lambda_{SSIM} L_{SSIM} + \lambda_{L_1} L_{L_1}$$

wherein $\lambda_{Focal\_loss}$, $\lambda_{GAN}$, $\lambda_{SSIM}$ and $\lambda_{L_1}$ are weighting coefficients of the Focal loss, the adversarial loss, the SSIM loss, and the L1 loss, respectively.

In some embodiments, $\lambda_{Focal\_loss}$, $\lambda_{GAN}$, $\lambda_{SSIM}$ and $\lambda_{L_1}$ are 0.2, 0.2, 0.4, and 0.2, respectively.

In some embodiments, step (S4) comprises:
(S401) acquiring a transmitted light image and a reflected light image; enhancing the reflected light image by using color restoration algorithm, and superimposing the transmitted light image on an enhanced reflected light image to obtain an initial sample required for training the online reflected light ferrograph image enhancement model;
(S402) taking the offline reflected light ferrograph image acquired by offline ferrography system as a final sample;
(S403) training the SqueezeNet-Unet-based wear particle position prediction network on an ImageNet dataset to obtain network parameters; and migrating the network parameters as pre-training parameters for an encoder of the SqueezeNet-Unet-based wear particle position prediction network;
(S404) training the online reflected light ferrograph image enhancement model by using an Adam algorithm with the reflected light image and the initial sample as training sample; and
(S405) training the online reflected light ferrograph image enhancement model by using a Stochastic Gradient Descent (SGD) algorithm with the reflected light image and the final sample obtained in step (S402) as training sample, to achieve construction of the online reflected light ferrograph image enhancement model and enhancement of the online reflected light ferrograph image.

In a second aspect, this application provides a system of enhancing an online reflected light ferrograph image, comprising:
a fusion module;
a weighting module;
a function module; and
an enhancement module;
wherein the fusion module is configured to fuse an Unet architecture and a SqueezeNet network to construct a SqueezeNet-Unet-based wear particle position prediction network based on contour markers of wear particles in the online reflected light ferrograph image;

the weighting module is configured to construct a ResNeXt-CycleGAN image transformation network based on CycleGAN architecture, and perform concatenate fusion on the SqueezeNet-Unet-based wear particle position prediction network and the ResNeXt-CycleGAN image transformation network to construct an online reflected light ferrograph image enhancement model;

the function module is configured to determine a loss function of the SqueezeNet-Unet-based wear particle position prediction network constructed by the fusion module, combine SSIM loss and L1 loss to optimize a cycle-consistency loss function of the ResNeXt-CycleGAN image transformation network, and design an overall loss function of the online reflected light ferrograph image enhancement model by weighted fusion; and the enhancement module is configured to optimize the online reflected light ferrograph image enhancement model with the overall loss function of the online reflected light ferrograph image enhancement model being an optimization object successively using a training sample set consisting of an original online reflected light ferrograph image and a traditional algorithm-enhanced online reflected light ferrograph image, and a training sample set consisting of the original online reflected light ferrograph image and an offline reflected light ferrograph image, so as to enhance features the wear particles in the online reflected light ferrograph image Compared to the prior art, the present disclosure at least has the following beneficial effects.

The method provided herein constructs a SqueezeNet-Unet model based on SqueezeNet and Unet by using a wear particle position marker map to automatically locate the wear particles in the reflected light image and provide effective guidance information for feature migration of the wear particles. The original online reflected light ferrograph image, the traditional-algorithm enhanced image, the original image, and the offline ferrograph image are used as training samples in turn for network training. The online reflected light ferrograph image enhancement model is constructed by fusing the SqueezeNet-Unet-based wear particle position prediction network and the ResNeXt-CycleGAN image transformation network, and the loss function and training method of the online reflected light ferrograph image enhancement model are optimized to achieve the stable training of the online reflected light ferrograph image enhancement model and the fast and accurate enhancement of multiple features in the online reflected light ferrograph image.

Further, in step (S1), a SqueezeNet-Unet model based on SqueezeNet and Unet is constructed to automatically locate the wear particle in the reflected light image and provide effective guidance information for feature migration of the wear particle.

Further, in step (S2), the online reflected light ferrograph image enhancement model achieves fast and accurate enhancement of multiple features in the online reflected light ferrograph image by fusing the SqueezeNet-Unet-based wear particle position prediction network and the ResNeXt-CycleGAN image transformation network.

Further, by fusing the wear particle distribution probability map output by the SqueezeNet-Unet-based wear particle position prediction network and the online reflected light ferrograph image, the input Input_Image of the ResNeXt-CycleGAN achieves a concatenate fusion of the SqueezeNet-Unet-based wear particle position prediction network and the ResNeXt-CycleGAN image transformation network in the online reflected light ferrograph image enhancement model.

Further, the image pixel output value of the output layer of the ResNeXt-CycleGAN image conversion network generator is 0-255, which is the same as the grayscale value range of the input image of the arbiter of the ResNeXt-CycleGAN image transformation network, facilitating image comparison by using the arbiter of the ResNeXt-CycleGAN image transformation network.

Further, the overall loss function of the online reflected light ferrograph image enhancement model is designed by weighted fusion to enable simultaneous training of the SqueezeNet-Unet-based wear particle position prediction network and the ResNeXt-CycleGAN image transformation network in the online reflected light ferrograph image enhancement model.

Further, the online reflected light ferrograph image enhancement model fuses Focal loss, antagonistic loss, SSIM loss and L1 loss function into an overall loss function through weighted fusion. The Focal loss balances the unevenly scaled wear particle and background in the reflected light image. The SSIM loss enhances the chromaticity and contrast of wear particles in the reflected light image. The antagonistic loss and L1 loss functions are the loss functions of the backbone CycleGAN network in the ResNeXt-CycleGAN image transformation network.

Further, since the cycle-consistency loss function of ResNeXt-CycleGAN is directly related to the enhancement of the reflected light image, $\lambda_{Focal\_loss}$, $\lambda_{GAN}$, $\lambda_{SSIM}$, and $\lambda_{L_1}$ are set to 0.2, 0.2, 0.4, and 0.2, respectively.

Further, the method provided herein sequentially successively uses a training sample set consisting of an original online reflected light ferrograph image and the traditional-algorithm-enhanced image, and a training sample set consisting of the original online reflected light ferrograph image and an offline reflected light ferrograph image the original image, and the offline ferrograph image as training samples for network training, preventing the network training from being unstable due to the large difference in features between the original online reflected light ferrograph image and the offline reflected light ferrograph image.

It should be understood that the beneficial effects of the above second to third aspects can be found in the relevant descriptions in the above first aspect and will not be repeated herein.

In summary, the present application achieves fast and accurate enhancement of multiple features of wear particles in the online reflected light ferrograph image, and is applicable to the enhancement of all online reflected light ferrograph image in the field of wear particle analysis.

The technical solution of the present disclosure will be described in detail below with reference to the accompanying drawings and embodiments.

DETAILED DESCRIPTION OF EMBODIMENTS

The technical solutions in the embodiments of the present disclosure will be clearly and completely described below with reference to the accompanying drawings. Obviously, described below are merely some embodiments of the present disclosure, which are not intended to limit the disclosure. Based on the embodiments described herein, all other embodiments obtained by one of ordinary skill in the art without paying creative work shall fall within the scope of the present disclosure.

As used herein, the terms "including" and "comprising" indicate the presence of the described feature, whole, step, operation, element and/or component, but do not exclude the presence or addition of one or more other features, whole, steps, operations, elements, and/or components.

It should also be understood that the terminology used herein is for the purpose of describing particular embodiments only and is not intended to limit the present disclosure. As used in the specification and the accompanying claims, the singular forms "one", "a", and "the" are intended to include the plural forms, unless otherwise specified.

It should further be understood that the term "and/or" as used in the specification of and the appended claims refers to any and all possible combinations of one or more of the related items and includes such combinations. For example, "A and/or B" may refer to A, B or a combination thereof. In addition, the "/" used herein generally indicates an "or" relationship between the preceding and following associated objects.

It should be understood that although the terms, such as "first", "second", and "third", may be used to describe predetermined ranges, these predetermined ranges should not be limited by these terms. These terms are only used to distinguish the predetermined ranges from each other. For example, without departing from the scope of embodiments of the present disclosure, the first predetermined range may also be referred to as the second predetermined range, and similarly the second predetermined range may also be referred to as the first predetermined range.

The word "if" as used herein may be interpreted as "at . . . ", "when . . . ", "in response to a determination", or "in response to a detection". Similarly, the phrase "if determined" or "if detected (the stated condition or event)" may be interpreted as "when determined", "in response to a determination", "when detecting (the stated condition or event)", or "in response to detecting (the stated condition or event)".

In the accompanying drawings are illustrated various structural schematics according to embodiments of the present disclosure. These drawings are not to scale, where certain details may be enlarged or omitted for clear representation. The shapes of the various zones and layers shown in the drawings and their relative size and position relationships are only exemplary and in practice may deviate due to manufacturing tolerances or technical limitations. Additional zones/layers with different shapes, sizes and relative positions may be designed by those skilled in the art according to practical needs.

This application provides a method for enhancing an online reflected light ferrograph image. In this method, an online reflected light ferrograph image is used as a study object. The SqueezeNet-Unet network is constructed based on SqueezeNet and Unet to automatically locate the precise position of wear particles in the online reflected light ferrograph image. The output of the SqueezeNet-Unet network and the online reflected light ferrograph image are subjected to weighted fusion to be used as the input of the ResNeXt-CycleGAN image transformation network, and a ResNeXt-CycleGAN-based online reflected light ferrograph image enhancement model is constructed based on the CycleGAN architecture. The weighted fusion of Focal loss, adversarial loss, and improved cycle-consistency loss is used as the optimization target for the online reflected light ferrograph image enhancement model. The training sample set consisting of an original online reflected light ferrograph image and the traditional-algorithm-enhanced image, and the training sample set consisting of the original online reflected light ferrograph image and the offline online reflected light ferrograph image are used in turn for the image enhancement model. By using Adam and SGD algorithms, the parameters of the image enhancement model are optimized, so as to gradually achieve a comprehensive enhancement of the features of the wear particles in the online reflected light ferrograph image and provide more accurate multiple information for the condition monitoring of mechanical equipment.

Figure 1:
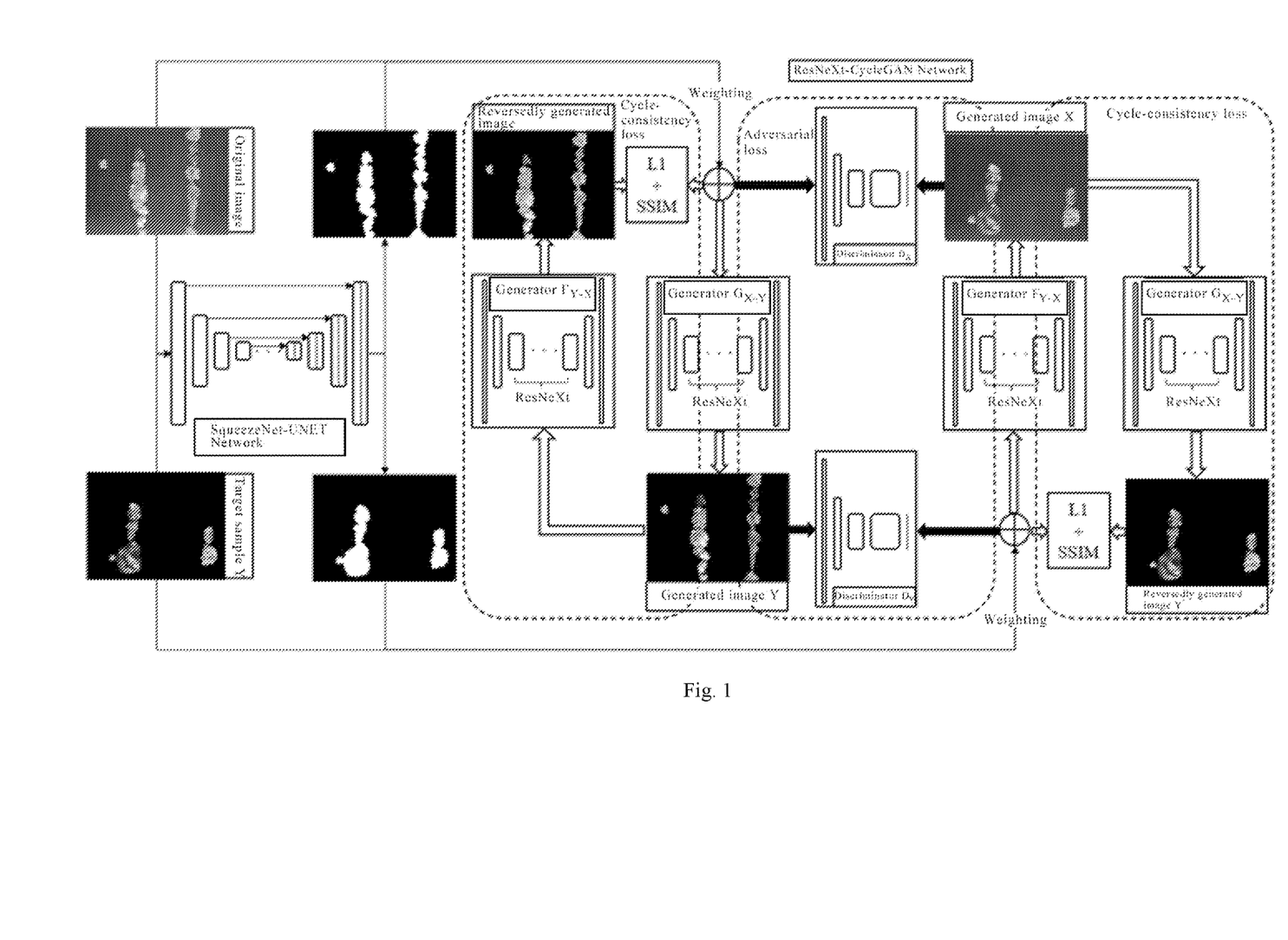
FIG. 1 schematically illustrates a method for enhancing an online reflected light ferrograph image according to an embodiment of this disclosure.

Referring to FIG. 1, a method for enhancing an online reflected light ferrograph image is illustrated, which includes the following steps.

(S1) A U-shaped encoder-decoder network (Unet) architecture and a SqueezeNet network are fused, based on contour markers of wear particles in the online reflected light ferrograph image, to construct a SqueezeNet-Unet-based wear particle position prediction network.

(S101) Contours of the wear particles in the online reflected light ferrograph image are marked to construct a wear particle position marking map.

(S102) An encoder of the SqueezeNet-Unet-based wear particle position prediction network is constructed based on the Unet architecture by using the SqueezeNet network combined with short-cut.

(S103) Up-sampling is performed on a wear particle feature map by using bicubic interpolation to construct a decoder of the SqueezeNet-Unet-based wear particle position prediction network. The high-dimensional features obtained by the up-sampling are connected to the low-dimensional features output by the same scale encoder by jump connection.

Figure 2:
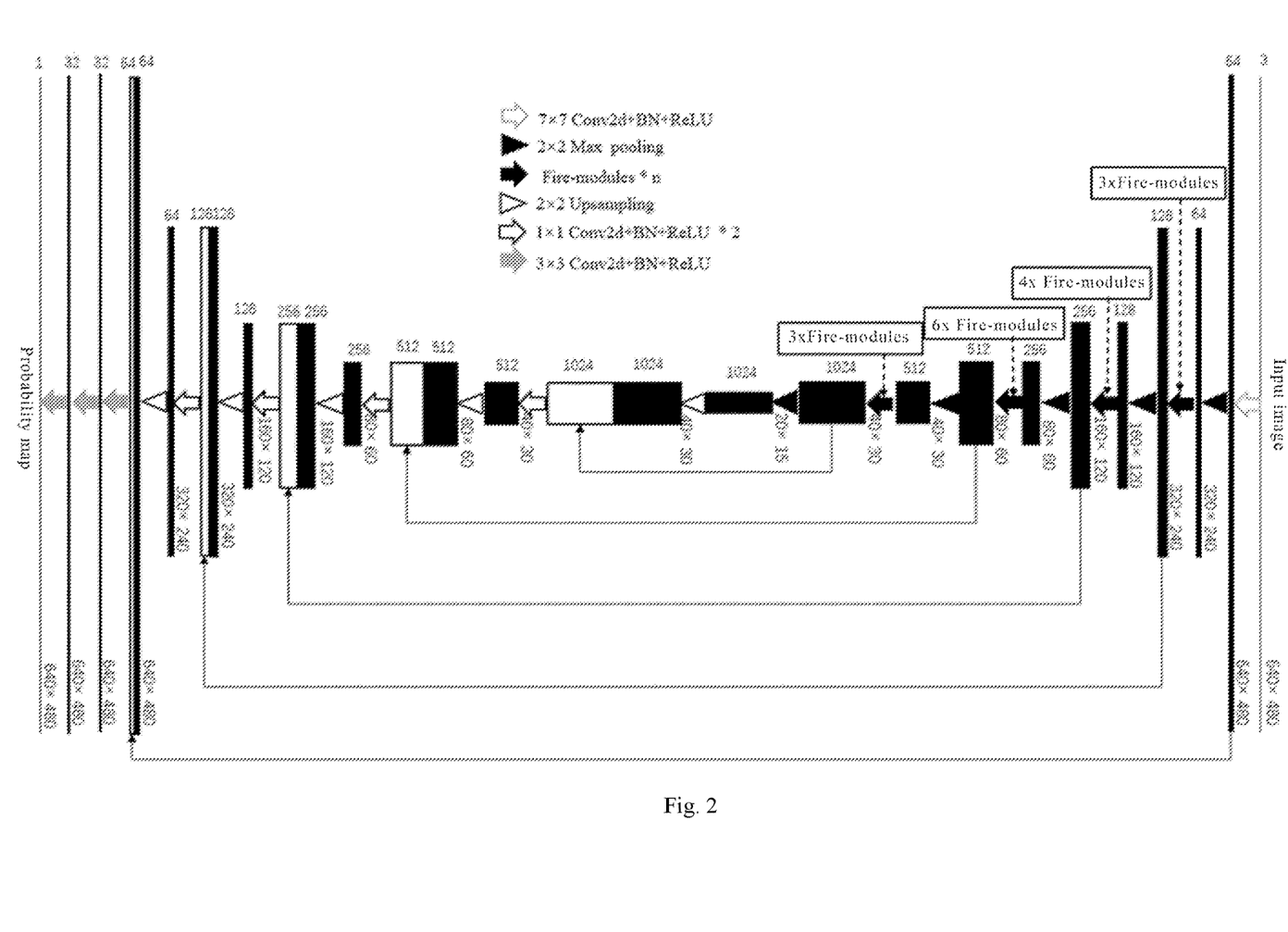
FIG. 2 shows a wear particle pixel position probability map according to an embodiment of this disclosure.
Figure 3A:
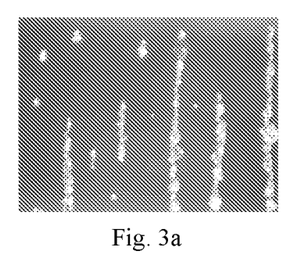
FIGS. 3a-3f are several reflected light ferrograph images, where (a): original image 1; (b): enhanced original image 1 by the method provided in the present disclosure; (c): original image 2; (d): enhanced original image 2 by the method provided in the present disclosure; (e): original image 3; and (f): enhanced original image 3 by the method provided in the present disclosure.
Figure 3B:
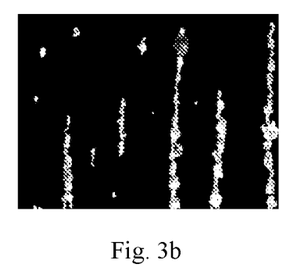
Figure 3C:
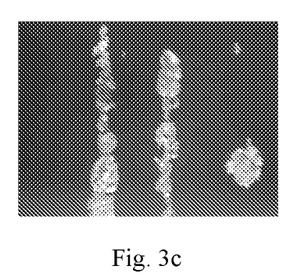
Figure 3D:
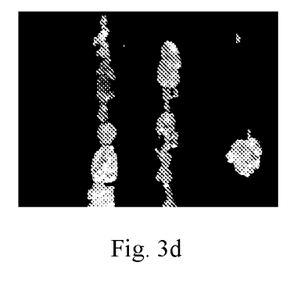
Figure 3E:
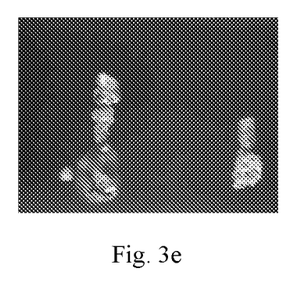
Figure 3F:
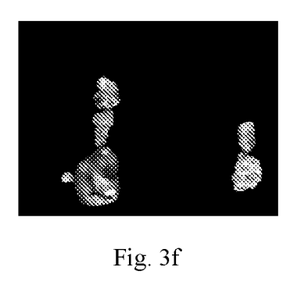

(S104) A Sigmoid activation function is taken as an output layer of the SqueezeNet-Unet-based wear particle position prediction network. An input image of the output layer is transformed into wear particle pixel position probability map to achieve automatic localization of the wear particles in the online reflected light ferrograph image, as shown in FIG. 2.

(S2) A ResNeXt-cycle-consistent generative adversarial network (CycleGAN) image transformation network is constructed based on a CycleGAN architecture. Concatenate fusion is performed on the SqueezeNet-Unet-based wear particle position prediction network and the ResNeXt-CycleGAN image transformation network to construct an online reflected light ferrograph image enhancement model.

The concatenate fusion is performed by weighted fusion, based on an output of the SqueezeNet-Unet-based wear particle position prediction network and an input of the ResNeXt-CycleGAN image transformation network.

(S201) The weighted fusion of SqueezeNet-Unet output and the online ferrography reflected light raw image is used as an input of the ResNeXt-CycleGAN image transformation network to highlight the wear particle region in the reflected light image and reduce the effect of the background of the reflected light image on wear particle image enhancement, as shown in formula (1):

$$\text{Input\_Image} = A * B = \begin{bmatrix} a_{11}b_{11} & \cdots & a_{1n}b_{1n} \\ \cdots & \cdots & \cdots \\ a_{m1}b_{m1} & \cdots & a_{nn}b_{nn} \end{bmatrix}; \quad (1)$$

where A represents an original reflected light image; B represents the wear particle pixel distribution probability map output by SqueezeNet-Unet; and m represents image length and n represents image width.

(S202) An input layer of a generator of the ResNeXt-CycleGAN image transformation network is formed by one Conv-GN-ReLU block to adjust the number of channels of an input image to the number of input channels of a feature extraction part. An encoder of the generator of the ResNeXt-CycleGAN image transformation network is constructed by using two Conv-GN-ReLU blocks. A feature transformation layer of the ResNeXt-CycleGAN image transformation network is constructed by using ResNeXt, which can reduce the training time while deepening the network layers. A decoder of the generator of the ResNeXt-CycleGAN image transformation network is constructed by using two Deconv-GN-ReLU blocks. An output layer of the generator of the ResNeXt-CycleGAN image transformation network is formed by one Conv-GN-Tan H block to make the number of channels of the output image the same as the input image, and a pixel output value of the output layer of the generator of the ResNeXt-CycleGAN image transformation network is controlled to be 0-255.

(S203) A PatchGAN structure of a Pix2pix network is used as a discriminator of the ResNeXt-CycleGAN image transformation network. A dropout layer is added to prevent overfitting of training when the reflected light image samples are few. FC-Sigmoid is used as an output layer of the discriminator to output image pixel discriminant probability.

(S3) The Focal loss function is used as a loss function of the SqueezeNet-Unet-based wear particle position prediction network. A cycle-consistency loss function of the ResNeXt-CycleGAN image transformation network is optimized by combining structural similarity (SSIM) loss and L1 loss. An overall loss function of the online reflected light ferrograph image enhancement model is designed by weighted fusion.

(S301) Since the balance factor in Focal loss can be used to balance the uneven ratio of wear particle to background in the reflected light image, the Focal loss function is used as the loss function of the SqueezeNet-Unet-based wear particle position prediction network.

(S302) A cross-entropy loss function is used as an adversarial loss function of the ResNeXt-CycleGAN image transformation network to improve the ability of the generator and discriminator of ResNeXt-CycleGAN network to play against each other.

(S303) SSIM can calculate image similarity based on the perception of the human visual system (HVS). To enhance the chromaticity and contrast of online ferrography reflected light images, SSIM loss function is used to match luminance and contrast information of a cycle-consistency reconstructed image of a ResNeXt-CycleGAN-based online reflected light ferrograph image enhancement model and the original online reflected light ferrograph image. The SSIM loss function $L_{SSIM}$ and L1 loss function $L_{L_1}$ are combined as the cycle-consistency loss function of the ResNeXt-CycleGAN image transformation network.

(S304) The overall loss function of the online reflected light ferrograph image enhancement model is obtained by weighted summation, based on the Focal loss of the SqueezeNet-Unet-based wear particle position prediction network and the adversarial loss LGAN and the cycle-consistency loss function of the ResNeXt-CycleGAN image-transformation network, expressed by formula (2):

$$L_{Model\_Loss} = \lambda_{Focal\_loss} L_{Focal\_loss} + \lambda_{GAN} L_{GAN} + \lambda_{SSIM} L_{SSIM} + \lambda_{L_1} L_{L_1};$$

where $\lambda_{Focal\_loss}$, $\lambda_{GAN}$, $\lambda_{SSIM}$, and $\lambda_{L_1}$ are weighting coefficients of the Focal loss, the adversarial loss, the SSIM loss, and the L1 loss, respectively.

Since the cyclic consistency loss function of ResNeXt-CycleGAN is directly related to the enhancement of the reflected light image, $\lambda_{Focal\_loss}$, $\lambda_{GAN}$, $\lambda_{SSIM}$, and $\lambda_{L_1}$ are set as 0.2, 0.2, 0.4, and 0.2, respectively.

(S4) The overall loss function of the online reflected light ferrograph image enhancement model is taken as an optimization object. A training sample set consisting of an original online reflected light ferrograph image and a traditional-algorithm-enhanced online reflected light ferrograph image, and a training sample set consisting of the original online reflected light ferrograph image and an offline reflected light ferrograph image are successively adopted to optimize parameters of the online reflected light ferrograph image enhancement model through Adam and SGD algorithms, so as to enhance features of the wear particles in the online reflected light ferrograph image.

(S401) A transmitted light image and a reflected light image are acquired. The reflected light image is enhanced by using color restoration algorithm, and the transmitted light image and an enhanced reflected light image are superimposed to obtain an initial sample required for training the online reflected light ferrograph image enhancement model.

(S402) The offline reflected light ferrograph image acquired by offline ferrography system is taken as a final sample to construct a final sample required for training the online reflected light ferrograph image enhancement model.

(S403) The SqueezeNet-Unet-based wear particle position prediction network is trained on an ImageNet dataset to obtain network parameters. The network parameters are migrated to be pre-training parameters for an encoder of the SqueezeNet-Unet-based wear particle position prediction network.

(S404) The online reflected light ferrograph image enhancement model is trained by using an Adam algorithm, with the original reflected light image and the initial sample as training samples.

(S405) The online reflected light ferrograph image enhancement model is trained by using a Stochastic Gradient Descent (SGD) algorithm, with the reflected light image and the final sample obtained in step (S402) as training sample, to achieve construction of the online reflected light ferrograph image enhancement model and enhancement of the online reflected light ferrograph image.

This application also provides a system of enhancing an online reflected light ferrograph image, which can used to implement the above-mentioned method for enhancing the online reflected light ferrograph image. The system includes a fusion module, a weighting module, a function module, and an enhancement module.

The fusion module is configured to fuse a Unet architecture and a SqueezeNet network to construct a SqueezeNet-Unet-based wear particle position prediction network based on contour markers of wear particles in the online reflected light ferrograph image.

The weighting module is configured to construct a ResNeXt-CycleGAN image transformation network based on CycleGAN architecture, and perform concatenate fusion on the SqueezeNet-Unet-based wear particle position prediction network and the ResNeXt-CycleGAN image transformation network to construct an online reflected light ferrograph image enhancement model.

The function module is configured to determine a loss function of the SqueezeNet-Unet-based wear particle position prediction network constructed by the fusion module, combine SSIM loss and L1 loss to optimize a cycle-consistency loss function of the ResNeXt-CycleGAN image transformation network, and design an overall loss function of the online reflected light ferrograph image enhancement model by weighted fusion.

The enhancement module is configured to optimize the online reflected light ferrograph image enhancement model by Adam and SGD, with the overall loss function of the online reflected light ferrograph image enhancement model being an optimization object, and a training sample set consisting of an original online reflected light ferrograph image and a traditional algorithm-enhanced online reflected light ferrograph image, and a training sample set consisting of the original online reflected light ferrograph image and an offline reflected light ferrograph image being successively adopted, so as to enhance features the wear particles in the online reflected light ferrograph image.

Referring to FIG. 3, the first set of images is from a base lubricant sample from a laboratory, and the second and third sets of images are from a severely deteriorated lubricant from an axle experiment. As shown in FIG. 3a, the original reflected light image has low contrast, blurred contours, and unclear detailed information due to light scattering. FIG. 3b shows the image of the wear particle obtained by the method provided herein. As shown in FIG. 3b, the contours of the wear particle are sharpened; the blurred edges caused by light scattering are suppressed; the artefacts in the strong light areas disappear; and the background color appears as a single black color, which is conducive to the subsequent extraction of features of wear particle. By using the enhancement method provided herein, the second and third sets of images are also enhanced, with sharp colors, clear contours, and eliminated background artefacts.

In conclusion, this application provides a method and system for enhancing an online reflected light ferrograph image. The SqueezeNet-Unet network is constructed based on SqueezeNet and Unet to automatically locate the precise position of wear particles in the online reflected light ferrograph image. A ResNeXt-CycleGAN-based online reflected light ferrograph image enhancement model is constructed based on the CycleGAN architecture. Concatenate fusion is performed on the SqueezeNet-Unet-based wear particle position prediction network and the ResNeXt-CycleGAN image transformation network to construct an online reflected light ferrograph image enhancement model. The weighted fusion of Focal loss, adversarial loss, and improved cycle-consistency loss is used as the optimization object for the online reflected light ferrograph image. A training sample set consisting of an original online reflected light ferrograph image and a traditional algorithm-enhanced online reflected light ferrograph image, and a training sample set consisting of the original online reflected light ferrograph image and an offline reflected light ferrograph image are used in turn to enhance the parameters of the image enhancement model by using Adam and SGD algorithms. The fusion of SqueezeNet-Unet and ResNeXt-CycleGAN enables fast and accurate enhancement of multiple features in online reflected light ferrograph images, solving the problem that current enhancement methods for online reflected light ferrograph images cannot enhance multiple features at the same time, which is applicable to the enhancement of all online reflected light ferrograph images in the field of wear particle analysis.

It should be understood by those skilled in the art that embodiments of the present application may be provided as methods, systems, or computer program products. Accordingly, the present application may take the form of an entirely hardware embodiment, an entirely software embodiment, or an embodiment combining software and hardware. Furthermore, the present application may take the form of a computer program product implemented on one or more computer-usable storage media (including, but not limited to, disk memory, CD-ROM, optical memory, etc.) containing computer-usable program code therein.

The present application is described with reference to flow charts and/or block diagrams of methods, devices (systems), and computer program products according to embodiments of the present application. It should be understood that each of the processes and/or boxes in the flowchart and/or block diagram, and the combinations of the processes and/or boxes in the flowchart and/or block diagram, may be implemented by computer program instructions. These computer program instructions may be provided to a processor of a general-purpose computer, a dedicated computer, an embedded processor or other programmable data processing device to produce a machine. In this case, the instructions, which are executed by the processor of the computer or other programmable data processing devices, produce a device for implementing the functions specified in one process or multiple processes of the flowchart and/or one box or multiple boxes of the block diagram.

These computer program instructions may also be stored in a computer-readable memory that can guide a computer or other programmable data processing device to work in a particular way. In this case, the instructions stored in the computer-readable memory can produce products including instruction devices. The instruction devices implement the functions specified in one or more processes in the flowchart and/or one or more boxes of the block diagram.

These computer program instructions may also be loaded onto a computer or other programmable data processing device such that a series of operational steps are performed on the computer or other programmable device to produce computer-implemented processing. In this case, the instructions executed on the computer or other programmable device provide steps for implementing the functions specified in one or more processes in the flowchart and/or one or more boxes of the block diagram.

The above description is merely for illustrating the technical ideas of the present disclosure and is not intended to limit the scope of the present disclosure. It should be noted that any modifications, replacements and variations made by those skilled in the art without departing from the spirit of the present disclosure shall fall within the scope of the present disclosure defined by the appended claims.

What is claimed is:

1. A method for enhancing an online reflected light ferrograph image, comprising:
  (S1) fusing a U-shaped encoder-decoder network (Unet) architecture and a SqueezeNet network, based on contour markers of wear particles in the online reflected light ferrograph image, to construct a SqueezeNet-Unet-based wear particle position prediction network through steps of:
    (S101) marking contours of the wear particles in the online reflected light ferrograph image to construct a wear particle position marking map;
    (S102) constructing an encoder of the SqueezeNet-Unet-based wear particle position prediction network based on the Unet architecture by using the SqueezeNet network combined with short-cut;
    (S103) performing up-sampling on a wear particle feature map by using bicubic interpolation to construct a decoder of the SqueezeNet-Unet-based wear particle position prediction network obtained in step (S102); and
    (S104) taking a Sigmoid activation function as an output layer of the SqueezeNet-Unet-based wear particle position prediction network obtained in step (S102); and transforming an input image of the output layer into wear particle pixel position probability map to achieve automatic localization of the wear particles in the online reflected light ferrograph image;
  (S2) constructing a ResNeXt-cycle-consistent generative adversarial network (CycleGAN) image transformation network based on a CycleGAN architecture; and subjecting the SqueezeNet-Unet-based wear particle position prediction network constructed in step (S1) and the ResNeXt-CycleGAN image transformation network to concatenate fusion to construct an online reflected light ferrograph image enhancement model;
  wherein
    a mode of the concatenate fusion is weighted fusion based on an output of the SqueezeNet-Unet-based wear particle position prediction network and the original online reflected light ferrograph image; and a fusion result is taken as an input of the ResNeXt-CycleGAN image transformation network;
    an input layer of a generator of the ResNext-CycleGAN image transformation network is formed by one Conv-GN-ReLU block, and is configured to adjust the number of channels of an input image to the number of input channels of a feature extraction part; an encoder of the generator of the ResNeXt-CycleGAN image transformation network is constructed by using two Conv-GN-ReLU blocks; a feature transformation layer of the generator of the ResNeXt-CycleGAN image transformation network is constructed by using ResNeXt; a decoder of the generator of the ResNext-CycleGAN image transformation network is constructed by using two Deconv-GN-ReLU blocks; and an output layer of the generator of the ResNeXt-CycleGAN image transformation network is formed by one Conv-GN-TanH block; and
    a PatchGAN structure of a Pix2pix network is used as a discriminator of the ResNeXt-CycleGAN image transformation network; a dropout layer is introduced, and fully connected (FC)-Sigmoid is used as an output layer of the discriminator to output an image pixel discrimination probability;
  (S3) determining a loss function of the SqueezeNet-Unet-based wear particle position prediction network constructed in step (S1); optimizing a cycle-consistency loss function of the ResNeXt-CycleGAN image transformation network constructed in step (S2) by combining structural similarity (SSIM) loss and L1 loss; and designing an overall loss function of the online reflected light ferrograph image enhancement model by weighted fusion;
  wherein the overall loss function of the online reflected light ferrograph image enhancement model is designed through steps of:
    taking a Focal loss as the loss function of the SqueezeNet-Unet-based wear particle position prediction network; and taking a cross-entropy loss as an adversarial loss function of the ResNext-CycleGAN image transformation network;
    matching luminance and contrast information of a cycle-consistency reconstructed image of the ResNeXt-CycleGAN image transformation network and an input image of the ResNeXt-CycleGAN image transformation network by using the SSIM loss; and combining the SSIM loss $L_{SSIM}$ and the loss $L_{L_1}$ as the cycle-consistency loss function of the ResNeXt-CycleGAN image transformation network; and
    obtaining the overall loss function of the online reflected light ferrograph image enhancement model by weighted sum based on the Focal loss $L_{Focal\_loss}$ of the SqueezeNet-Unet-based wear particle position prediction network and an adversarial loss $L_{GAN}$ and the cycle-consistency loss function of the ResNeXt-CycleGAN image transformation network; and
  (S4) with the overall loss function of the online reflected light ferrograph image enhancement model obtained in step (S3) as an optimization object, successively adopting a training sample set consisting of an original online reflected light ferrograph image and a traditional algorithm-enhanced online reflected light ferrograph image, and a training sample set consisting of the original online reflected light ferrograph image and an offline reflected light ferrograph image to optimize the online reflected light ferrograph image enhancement model constructed in step (S2), so as to enhance features of the wear particles in the online reflected light ferrograph image;
  wherein step (S4) is performed through steps of:
    (S401) acquiring a transmitted light image and a reflected light image; enhancing the reflected light image by using color restoration algorithm, and superimposing the transmitted light image on an enhanced reflected light image to obtain an initial sample required for training the online reflected light ferrograph image enhancement model;
    (S402) taking the offline reflected light ferrograph image acquired by offline ferrography system as a final sample;
    (S403) training the SqueezeNet-Unet-based wear particle position prediction network on an ImageNet dataset to obtain network parameters; and migrating the network parameters as pre-training parameters for an encoder of the SqueezeNet-Unet-based wear particle position prediction network;

(S404) training the online reflected light ferrograph image enhancement model by using an Adam algorithm with the reflected light image and the initial sample obtained in step (S401) as training sample; and (S405) training the online reflected light ferrograph image enhancement model by using a Stochastic Gradient Descent (SGD) algorithm with the reflected light image and the final sample obtained in step (S402) as training sample, to achieve construction of the online reflected light ferrograph image enhancement model and enhancement of the online reflected light ferrograph image.

2. The method of claim 1, wherein in step (S2), an input image of the ResNeXt-CycleGAN image transformation network is expressed by:

$$\text{Input\_Image} = A * B = \begin{bmatrix} a_{11}b_{11} & \ldots & a_{1n}b_{1n} \\ \ldots & \ldots & \ldots \\ a_{m1}b_{m1} & \ldots & a_{nn}b_{nn} \end{bmatrix};$$

wherein A represents an original reflected light image; B represents a wear particle distribution probability map output by SqueezeNet-Unet; and m represents image length and n represents image width.

3. The method of claim 1, wherein in step (S2), a pixel output value of the output layer of the generator of the ResNeXt-CycleGAN image transformation network is 0-255.

4. The method of claim 1, wherein in step (S3), the overall loss function $L_{Model\_Loss}$ of the online reflected light ferrograph image enhancement model is expressed as:

$$L_{Model\_Loss} = \lambda_{Focal\_loss} L_{Focal\_loss} + \lambda_{GAN} L_{GAN} + \lambda_{SSIM} L_{SSIM} + \lambda_{L_1} L_{L_1}$$

wherein $\lambda_{Focal\_loss}$, $\lambda_{GAN}$, $\lambda_{SSIM}$, and $\lambda_{L_1}$ are weighting coefficients of the Focal loss, the adversarial loss, the SSIM loss, and the L1 loss, respectively.

5. The method of claim 4, wherein $\lambda_{Focal\_loss}$, $\lambda_{GAN}$, $\lambda_{SSIM}$, and $\lambda_{L_1}$ are 0.2, 0.2, 0.2, 0.4, and 0.2, respectively.

6. A system of enhancing an online reflected light ferrograph image, which is applied to the method of claim 1, comprising:
a fusion module;
a weighting module;
a function module; and
an enhancement module;
wherein the fusion module is configured to fuse a Unet architecture and a SqueezeNet network to construct a SqueezeNet-Unet-based wear particle position prediction network based on contour markers of wear particles in the online reflected light ferrograph image through steps of:
(S101) marking contours of the wear particles in the online reflected light ferrograph image to construct a wear particle position marking map;
(S102) constructing an encoder of the SqueezeNet-Unet-based wear particle position prediction network based on the Unet architecture by using the SqueezeNet network combined with short-cut;
(S103) performing up-sampling on a wear particle feature map by using bicubic interpolation to construct a decoder of the SqueezeNet-Unet-based wear particle position prediction network obtained in step (S102); and
(S104) taking a Sigmoid activation function as an output layer of the SqueezeNet-Unet-based wear particle position prediction network obtained in step (S102); and transforming an input image of the output layer into wear particle pixel position probability map to achieve automatic localization of the wear particles in the online reflected light ferrograph image;
the weighting module is configured to construct a ResNeXt-CycleGAN image transformation network based on CycleGAN architecture, and perform concatenate fusion on the SqueezeNet-Unet-based wear particle position prediction network constructed by the fusion module and the ResNeXt-CycleGAN image transformation network to construct an online reflected light ferrograph image enhancement model;
wherein
a mode of the concatenate fusion is weighted fusion based on an output of the SqueezeNet-Unet-based wear particle position prediction network and the original online reflected light ferrograph image; and a fusion result is taken as an input of the ResNeXt-CycleGAN image transformation network;
an input layer of a generator of the ResNext-CycleGAN image transformation network is formed by one Conv-GN-ReLU block, and is configured to adjust the number of channels of an input image to the number of input channels of a feature extraction part; an encoder of the generator of the ResNeXt-CycleGAN image transformation network is constructed by using two Conv-GN-ReLU blocks; a feature transformation layer of the generator of the ResNeXt-CycleGAN image transformation network is constructed by using ResNeXt; a decoder of the generator of the ResNext-CycleGAN image transformation network is constructed by using two Deconv-GN-ReLU blocks; and an output layer of the generator of the ResNext-CycleGAN image transformation network is formed by one Conv-GN-Tan H block; and
a PatchGAN structure of a Pix2pix network is configured as a discriminator of the ResNeXt-CycleGAN image transformation network; a dropout layer is introduced, and fully connected (FC)-Sigmoid is configured as an output layer of the discriminator to output an image pixel discrimination probability;
the function module is configured to determine a loss function of the SqueezeNet-Unet-based wear particle position prediction network constructed by the fusion module, combine SSIM loss and L1 loss to optimize a cycle-consistency loss function of the ResNeXt-CycleGAN image transformation network constructed by the weighting module, and design an overall loss function of the online reflected light ferrograph image enhancement model by weighted fusion;
wherein the overall loss function of the online reflected light ferrograph image enhancement model is configured to be designed through steps of:
taking a Focal loss as the loss function of the SqueezeNet-Unet-based wear particle position prediction network; and taking a cross-entropy loss as an adversarial loss function of the ResNext-CycleGAN image transformation network;

matching luminance and contrast information of a cycle-consistency reconstructed image of the ResNeXt-CycleGAN image transformation network and an input image of the ResNeXt-CycleGAN image transformation network by using the SSIM loss; and combining the SSIM loss $L_{SSIM}$ and the loss $L_{L_1}$ as the cycle-consistency loss function of the ResNeXt-CycleGAN image transformation network; and obtaining the overall loss function of the online reflected light ferrograph image enhancement model by weighted sum based on the Focal loss $L_{Focal\_loss}$ of the SqueezeNet-Unet-based wear particle position prediction network and an adversarial loss $L_{GAN}$ and the cycle-consistency loss function of the ResNeXt-CycleGAN image transformation network; and the enhancement module is configured to optimize the online reflected light ferrograph image enhancement model constructed by the weighting module, with the overall loss function of the online reflected light ferrograph image enhancement model obtained by the function module being an optimization object, and a training sample set consisting of an original online reflected light ferrograph image and a traditional algorithm-enhanced online reflected light ferrograph image, and a training sample set consisting of the original online reflected light ferrograph image and an offline reflected light ferrograph image being successively used, so as to enhance features of the wear particles in the online reflected light ferrograph image;

wherein the enhancement module is further configured to perform:

acquiring a transmitted light image and a reflected light image; enhancing the reflected light image by using color restoration algorithm, and superimposing the transmitted light image on an enhanced reflected light image to obtain an initial sample required for training the online reflected light ferrograph image enhancement model;

taking the offline reflected light ferrograph image acquired by offline ferrography system as a final sample;

training the SqueezeNet-Unet-based wear particle position prediction network on an ImageNet dataset to obtain network parameters; and migrating the network parameters as pre-training parameters for an encoder of the SqueezeNet-Unet-based wear particle position prediction network;

training the online reflected light ferrograph image enhancement model by using an Adam algorithm with the reflected light image and the obtained initial sample as training sample; and training the online reflected light ferrograph image enhancement model by using a Stochastic Gradient Descent (SGD) algorithm with the reflected light image and the obtained final sample as training sample, to achieve construction of the online reflected light ferrograph image enhancement model and enhancement of the online reflected light ferrograph image.

\* \* \* \* \*